June 16, 1942. W. W. GARSTANG 2,286,847
VARIABLE FREQUENCY VIBRATOR CURRENT-CONVERTING SYSTEM
Filed July 17, 1940
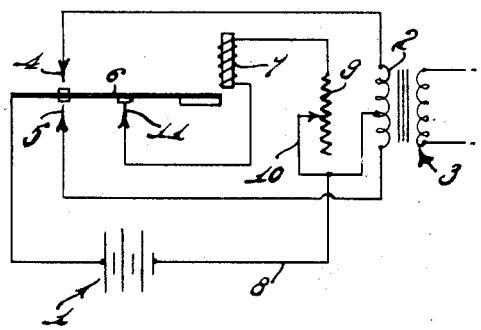
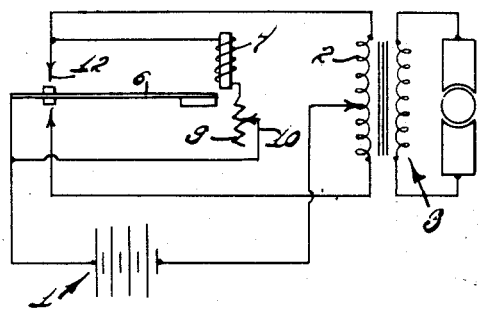
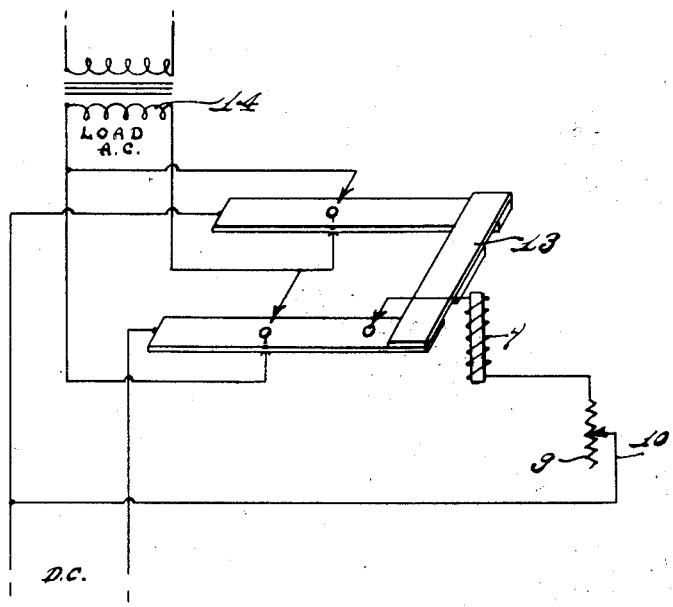
INVENTOR.
William W. Garstang,
BY
Hood & Hahn.
ATTORNEYS.

UNITED STATES PATENT OFFICE 2,286,847

VARIABLE FREQUENCY VIBRATOR CURRENT-CONVERTING SYSTEM

William W. Garstang, Indianapolis, Ind., assignor to Electronic Laboratories, Incorporated, Indianapolis, Ind., a corporation of Indiana Application July 17, 1940, Serial No. 345,997

3 Claims. (Cl. 175—365)

The present invention relates to improvements in vibrator converter circuits, primarily of that type wherein a direct current is converted through the instrumentality of a vibrator switch and suitable transformer into an alternating current.

In certain uses to which this type of converter is applied, it is found to be highly advantageous and, in some instances almost necessary, to tune the frequency of the alternating current delivered by this type of apparatus within certain limits.

For example, certain types of electric organs now on the market are operated by alternating current and the frequency of the current delivered thereto determines the tone. In some instances, it is highly desirable that the tone, where the organ is used in connection with other instruments, of the organ be tuned to the other instruments. By varying the frequency of the alternating current delivered to the organ, such tuning can be accomplished within short ranges.

It is the object of my present invention to provide an alternating current converter of the vibrator controlled type wherein the frequency of the current delivered thereby may be manually changed by suitable adjustment of the parts.

For the purpose of disclosing the invention, I have illustrated certain embodiments thereof in the acompanying drawing, in which:

Fig. 1 is a diagrammatic view of a vibrator converter circuit embodying my invention;

Fig. 2 is a diagrammatic view of a modification thereof; and

Fig. 3 is a diagrammatic view of a further modification thereof.

Referring to the circuit arrangement illustrated in the various drawings in Fig. 1, there is provided a suitable source of direct current supply 1 which supplies current to the primary winding 2 of a transformer 3. Preferably one terminal of the, in this instance battery, is tapped at the middle of the primary winding 2. The opposite terminals of the winding 2 are adapted to be connected, respectively, to stationary contacts 4 and 5 of a vibrating switch which includes a vibrating reed 6. This reed is adapted to be connected to the opposite terminal of the battery 1 and the contacts of this reed 6 are adapted to alternately engage the stationary contacts 4 and 5 thereby closing the current flow through alternate sections of the primary winding 2 in opposite directions.

For operating the vibrating reed 6, I provide an electromagnet having an energizing coil 7 which is supplied through an independent circuit 8 with energizing current from the battery 1. One terminal of this coil 7 is connected with the battery 1 through a resistance 9 controlled by a vernier switch 10 and the opposite terminal of the winding is connected to a stationary contact 11 normally in engagement with a contact on the vibrating reed 6. When current is initially closed through the winding 7, the vibrating reed 6 will be moved toward the electromagnet of the winding, thereby closing the circuit through one section of the winding 2 from the battery 1 in one direction. At the same time, the movement of the reed 6 opens the circuit of the coil 7, thereby releasing the reed and permitting it to vibrate in an opposite direction. As it is moved in the opposite direction, it not only closes its own circuit but also establishes a circuit through a section of the winding 2 in an opposite direction.

The periods of vibration of the reed are dependent, of course, upon the energy supplied to the winding 7. Assuming that the frequency of the reed with no resistance in the circuit of the coil 7 to be sixty cycles, thereby causing a sixty cycle A. C. current to be delivered by the transformer, if it desired to slightly modify this frequency, by adjusting the vernier switch 10 and accordingly the resistance 9 in the circuit of the coil 7 either to permit less energy to flow through the coil 7, the frequency of the vibration of the reed may be accordingly modified. In actual practice, the frequency is not modified to a great extent, possibly not over five percent of its normal frequency. However, such adjustment will permit the variation of the cycle frequency of the current delivered, assuming that the frequency is normally sixty cycles of a plus or minus two cycles. In actual practice, the periods of vibration of the reed or the frequency is the natural frequency of the reed and by varying the amplitude of the reed, I am enabled to vary the frequency thereof. In the structure disclosed, I provide a tuned reed, the frequency of which is modified, in accordance with my invention, by modifying the amplitude thereof.

Where it is desirable to adjust the normal frequency plus or minus, initially the energy supplied to the electromagnet for driving the reed is sufficient with a certain proportion of the resistance included in its circuit to drive the reed at its normal frequency. That is, as an illustration, the vernier switch 10 may be set in mid-position, as illustrated in the drawing, in which position a certain amount of resistance is included in the winding of the magnet 7. With the switch in this position, the vibrations of the reed is sufficient to produce, as an illustration, sixty cycles. If it is desired to vary the cycles plus, the vernier switch will be moved from its mid-position to increase the amount of resistance introduced in the magnet circuit, thereby decreasing the amplitude of the reed and thus increasing the frequency of its operation. On the other hand, if it is desired to modify the cycles minus, the switch 10 will be moved from its mid-position to decrease the normal amount of resistance in the circuit of the magnet, thus increasing its energy and thereby increasing the amplitude of the reed, thereby decreasing the frequency of the reed and accordingly the frequency of the alternating current.

In the modification illustrated in Fig. 2 instead of providing, as in Fig. 1, an independent energizing circuit for the winding 7 this winding is connected, in starting, in series with one section of the transformer winding 2 and the circuit arrangement is such that when the vibrating reed 6 engages the stationary contact 12 it short circuits the winding 7 of the magnet, however, maintaining a circuit through the primary winding 2 of the transformer. On its movement in the opposite direction the vibrating reed will close the circuit through the other section of the primary winding of the transformer in the opposite direction. As soon, however, as the reed swings back to its substantially center position, opening the last-mentioned circuit, the magnet coil 7 will again be energized, completing the movement of the reed in the opposite direction, thereby maintaining the vibration of the reed and alternately opening and closing the circuit through the sections of the primary winding in opposite directions. The vernier switch 10 controls a resistance 9 in substantially the same manner as is provided in the circuit illustrated in Fig. 1.

In Fig. 3, I have illustrated a further modification of my invention wherein the vibrating switch 13 is a pole changing switch alternately closing the circuit through the complete primary winding coil 14. In this structure, however, as in the arrangements illustrated in Figs. 1 and 2, the vernier switch 10 controls the resistance 9 in the circuit of the energizing winding 7 of the electromagnet operating the vibrating reed 13 of the switch. In this instance, as is the case in Fig. 1, the vibrating reed opens and closes the circuit of the winding 7 instead of short-circuiting the same, as is illustrated in Fig. 2.

I claim as my invention:

1. An electric system for converting direct current into alternating current including a transformer having an input winding and an output winding, a source of direct current, a vibratory interrupter including a resilient reed having a natural period of vibration and an electromagnet supplied with energy from said direct current source and having its circuit interrupted by said reed for inducing vibrations in said reed in one direction against the normal bias of said reed to a neutral position, the movement of the reed in the opposite direction beyond its normal position being induced by its own resiliency, said interrupter supplying an interrupted direct current from said source to said input winding of a frequency corresponding to the frequency of said reed, and means for varying the frequency of the alternating current delivered by said output winding comprising manually operated means for varying the energy supplied from said direct current source to said energizing winding to modify the force exerted by said winding to overcome the natural bias of said reed and thereby change the frequency of vibration of said reed above or below its natural frequency.

2. An electric system for converting direct current into alternating current including a transformer having an output winding and input winding, a source of direct current, a vibrating interrupter including a resilient reed having a natural period of vibration and an electromagnet supplied with energy from said direct current source and having its current interrupted by said reed for inducing vibrations in said reed in one direction against the normal bias of said reed to a neutral position, the movement of the reed in the opposite direction beyond its normal position being induced by its own resiliency, said interrupter supplying an interrupted direct current from said source to said input winding of a frequency corresponding to the frequency of said reed, and means for varying the frequency of the alternating current delivered by said output winding comprising a manually variable resistance in the circuit of said winding for varying the energy supplied from said direct current source to said energizing winding to modify the force exerted by said winding to overcome the natural bias thereof and thereby change the frequency vibration of said reed above or below its natural frequency.

3. An electric system for converting direct current into alternating current including a transformer having an input winding and an output winding, a source of direct current, a vibratory interrupter including a resilient reed having a natural period of vibration and an electromagnet supplied with energy from said direct current source and having its circuit interrupted by said reed for inducing vibrations in said reed in one direction against the normal bias of said reed to a neutral position, the movement of the reed in the opposite direction beyond its normal position being induced by its own resiliency, said interrupter supplying an interrupted direct current from said source to said input winding of a frequency corresponding to the frequency of said reed, and means for varying the frequency of the alternating current delivered by said output winding comprising a manually variable resistance in series with said winding for varying the energy supplied from said direct current source to said energizing winding to modify the force exerted by said energizing winding to overcome the natural bias of said reed and thereby change the frequency of vibrations of said reed above or below its natural frequency.

WILLIAM W. GARSTANG.